Dec. 23, 1958 J. H. MESTER 2,865,485
EJECTOR FOR REMOVING STRIPS LATERALLY FROM A TABLE
Filed Jan. 9, 1956 2 Sheets-Sheet 1
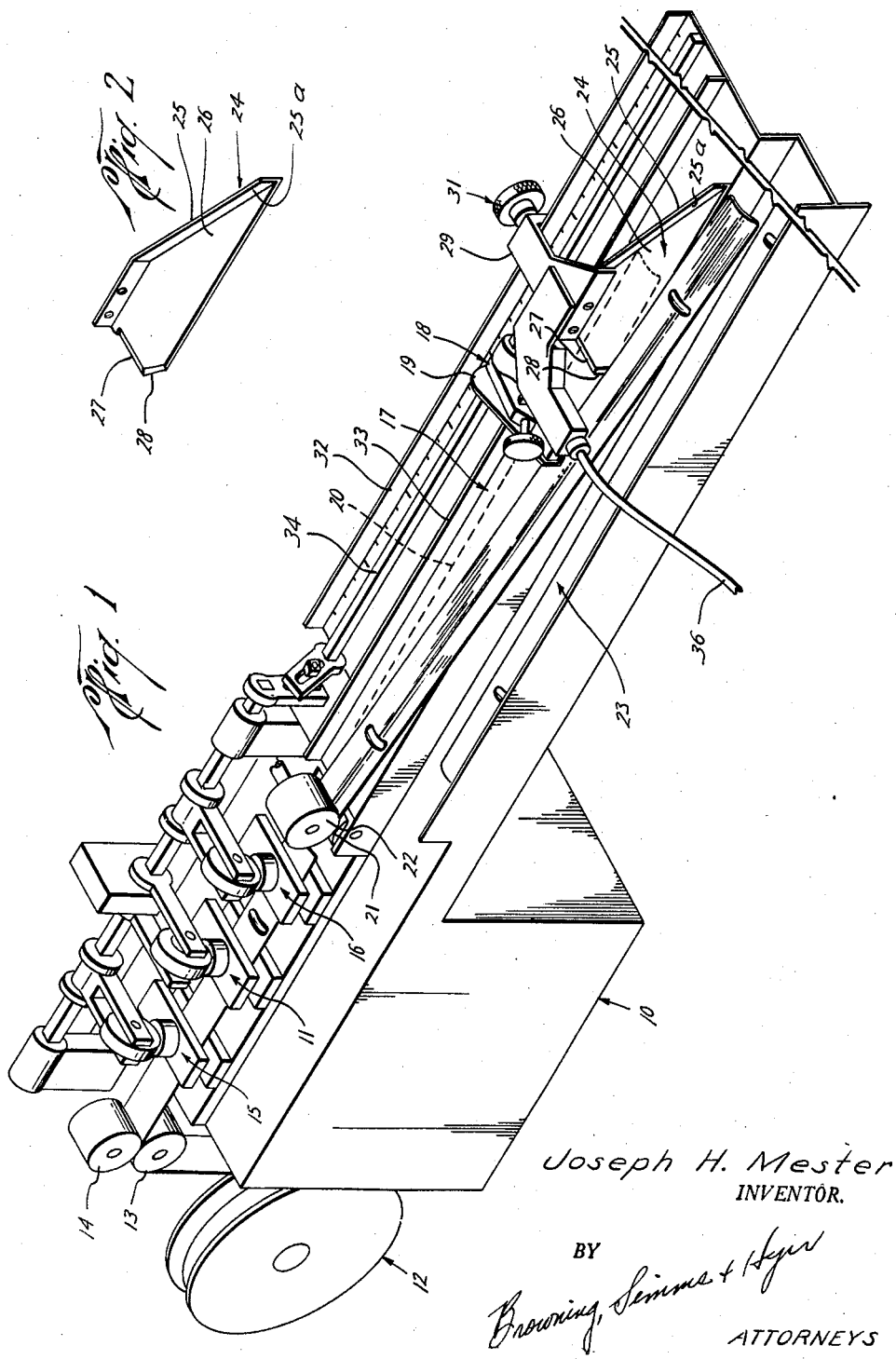
Joseph H. Mester
INVENTOR.
BY
ATTORNEYS Dec. 23, 1958 J. H. MESTER 2,865,485
EJECTOR FOR REMOVING STRIPS LATERALLY FROM A TABLE
Filed Jan. 9, 1956 2 Sheets-Sheet 2
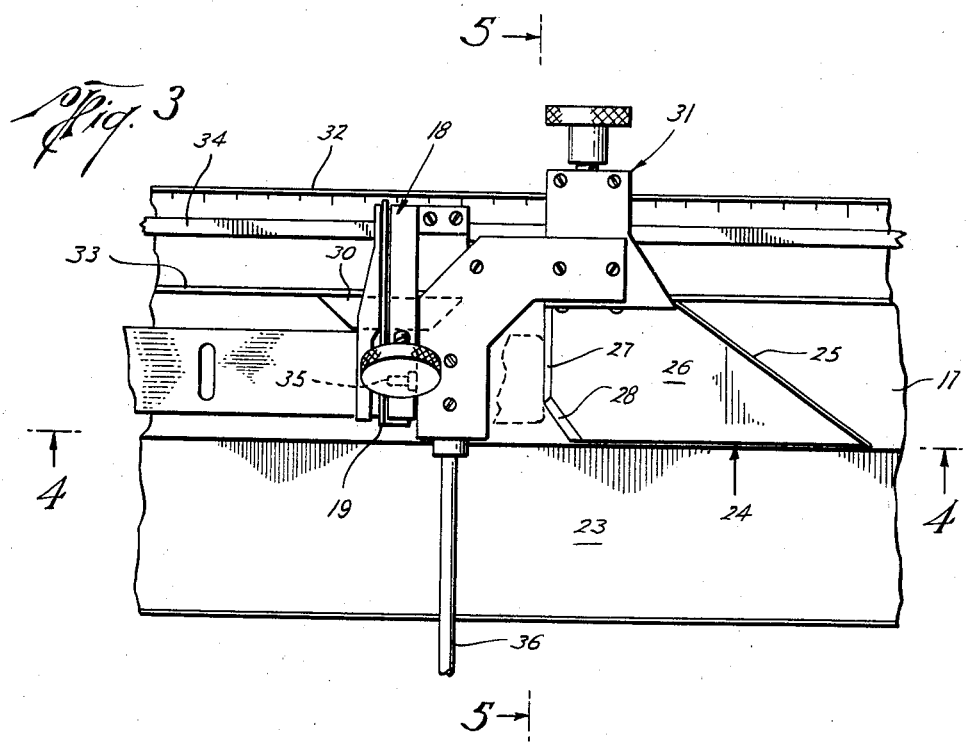
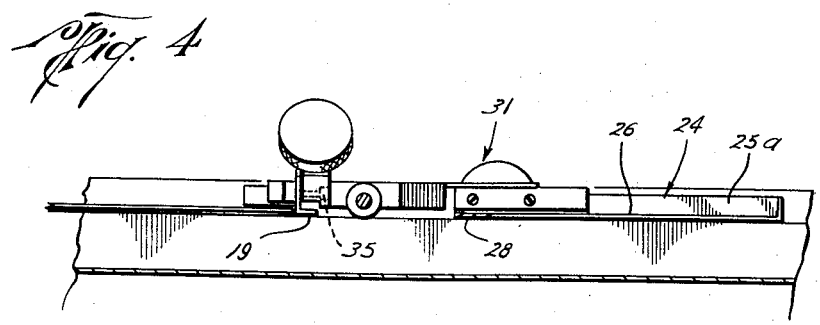
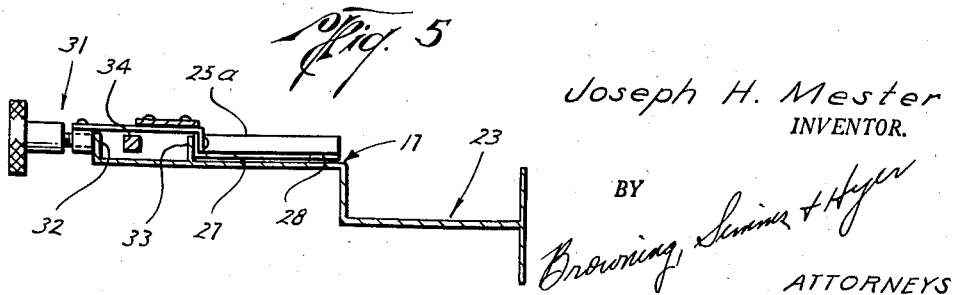
Joseph H. Mester
INVENTOR.
BY
ATTORNEYS

United States Patent Office 2,865,485
Patented Dec. 23, 1958

2,865,485

EJECTOR FOR REMOVING STRIPS LATERALLY FROM A TABLE

Joseph H. Mester, New Braunfels, Tex.

Application January 9, 1956, Serial No. 557,908

3 Claims. (Cl. 193—39)

This invention relates to a machine for fabricating Venetian blind slats and more particularly to such a machine equipped with an ejector for removing cut slats laterally from the measuring table of the machine.

Metal Venetian blind slats are cut from a continuous roll of slat material by an automatic machine which is usually both a cutter and router. Usually three tools are actuated simultaneously to cut off a slat and to stamp out a cord hole in the cut slat and in the roll of material adjacent its cut end. In other words, a cutter is positioned between two routers. Conventional machines are provided with a measuring table to support the material after it has passed through the cutter and router and a switch assembly is selectively positioned on the table in the path of the slat material. The end of the slat material is moved into abutment with the switch which energizes the cutter and routers. The positioning of the switch assembly along the table will determine the length of the slat. As soon as the cutter and router finish their task the finished slat must be cleared from the table to permit the machine to feed another length of slat material onto the table so that the operation may be repeated. As the switch cannot return to a position to be contacted by the end of the stock material until the table is cleared, a ball-up results each time a cut slat is not properly ejected from the table and the machine continuously feeds uncut stock into the room at a high rate of speed. These machines are designed for rapid cutting of slats and a successful ejector must quickly clear the table to be absolutely free from ball-ups.

Different ways have been proposed to eject the slats from the table, but these proposals have never been sufficiently dependable to long leave the machine unattended as they will all occasionally ball up. For instance, one type of machine employs a spring member to kick the trailing edge of a slat out approximately a half slat width and depends upon the oncoming slat material to push the cut slat off the table. See U. S. Letters Patent to Royer No. 2,569,197.

Another form of device proposed for ejecting slats employs an arm having a surface arranged normal to the table and extending diagonally across the path of a cut slat as it moves under the measuring stop. This arm is held on the table by magnetic attraction. While a very close contact is had between the arm and table the corner of the front end of the slats tends to dig into the crack between the table and arm and the resulting friction occasionally causes ball-ups. This is particularly true when this form of ejector is used with the very thin metal now used in very inexpensive Venetian blinds. This metal is so thin that it tends to buckle upon very slight resistance and tends to frequently cause a ball-up when run in machines using this type of ejector. Slat cutting machines usually round the corners of the ends of the slats. However, occasionally a corner is left square by the stock getting out of line in the cutter and the sharp angle corner will be in contact with the table and will frequently dig in under the arm and cause a ball-up.

It is an object of this invention to provide an automatic Venetian blind slat cutting machine for cutting slats of selective lengths which is not subject to ball-ups and the machine may be left unattended to automatically cut a number of slats from a roll of continuous stock material.

Another object is to provide an automatic Venetian blind slat cutting machine for cutting slats of selective lengths which is provided with an ejector which acts on the forward section of a cut slat to impart lateral movement thereto in which the ejector does not resist forward movement of a cut slat with enough force to cause a ball-up with the thinnest grade of Venetian blind material irregardless of the shape of the corners of the ends of the slats.

Another object is to provide an automatic Venetian blind slat cutting machine for cutting slats of selective length which employs a diagonal arm ejector but is not subject to ball-ups.

Another object is to provide an ejector for a Venetian blind machine of the type employing an arm selectively positionable along the measuring table of the machine and extending diagonally across the path of travel of a cut slat in which the slat cannot dig in between the arm and table.

Other objects, features, and advantages of this invention will be apparent from a consideration of the drawings, specification and the appended claims.

In the drawings wherein there is shown by way of illustration the preferred embodiment of this invention and wherein like reference numerals indicate like parts:

Fig. 1 is a schematic view of a Venetian blind slat cutting machine equipped with the preferred form of ejecting mechanism of this invention;

Fig. 2 is an isometric view of the ejecting device of this invention detached from the means for securing the ejector to the measuring table of the slat cutting machine;

Fig. 3 is a plan view of a fragment of the measuring table and slat bin of the machine of Fig. 1 showing the measuring stop, actuating switch and ejector means in place on the table;

Fig. 4 is a fragmentary view along the lines 4—4 of Fig. 3; and

Fig. 5 is a view along the lines 5—5 of Fig. 3.

Referring particularly to Fig. 1, the Venetian blind slat cutting machine indicated generally at 10 is more or less conventional in form and employs a cutter indicated generally at 11 for cutting off a length of slat material fed through the machine from a roll of slat material indicated generally at 12 by feed and idle rollers 13 and 14, respectively. At the same time that a slat is severed from the stock, routers indicated generally at 15 and 16, punch out the cord receiving holes adjacent the trailing end of a slat and adjacent the end of the stock from which the slat is cut.

Slat stock is fed through the routers and cutter and along the measuring table indicated generally at 17 until it engages the switch mechanism indicated generally at 18. Upon engagement of the switch mechanism by the end of the stock material the switch mechanism actuates the cutter 11 and routers 15 and 16 to perform the operations explained above. As soon as such operations are performed, the measuring stop 19 of the switch mechanism raises sufficient to permit the cut slat to move thereunder as indicated in dashed outline at 20 and to be moved along the table by drive and idler rollers 21 and 22, respectively, positioned on the measuring table side of the cutter and routers. The drive roller 21 is synchronized with drive roller 13 so that it will move a cut slat out of the way at the same speed that the slat material is fed onto the table by the feed rollers 13 and 14.

It will be appreciated that the measuring table indicated generally at 17 will be some 10 or 15 feet in length to permit cutting of blind slats to cover single and plural windows of varying widths and therefore the switch 18 and its associate measuring stop 19 are selectively positioned along the length of the table to provide for cutting off a slat of the desired length. The usual practice is to set up the machine to automatically cut a selected number of slats of a particular length and then to move the switch mechanism to another location for a run of slats of a different length. It will further be appreciated that Venetian blinds are in large part made to order for contractors and the users of the machine require that they be capable of cutting slats of any desired length so that one machine may be employed instead of a number of machines set to cut blinds of single lengths.

While the rollers 21 and 22 are preferred for moving a cut slat from the measuring table into the slat bin indicated generally at 23, it will be understood that other means might be employed for moving the cut slat along the table such as providing for the oncoming material to push the cut slat along the table.

It will be appreciated that as the slat stock must come to a complete stop during the cutting operations, rollers 21 and 22 must be set with a pressure which will permit slippage between the drive roller and slat or a slip clutch must be provided for the drive roller. In either event force exerted on a cut slat while it is held stationary by the measuring stop 19 must not be sufficient to cause the cut slat between the roller and the measuring stop to buckle.

Due to the long length of the table and the fact that the slats vary greatly in length, the slat bin must be positioned laterally of the table and the slats must each individually be moved laterally from the table as they are cut to prevent ball-ups. That is, if a slat is left on the table the oncoming material will usually run under the slat and in that way pass under the measuring stop and the machine will feed loose slat stock out into the room until the ball-up is cleared. For this reason, there must be provided a means for laterally ejecting the slats which is absolutely dependable and not subject to ball-up so that the machine may be operated without the attention of an operator.

Lateral ejection of cut slats may be provided for by an ejector indicated generally at 24. This ejector includes an ejector arm 25 which extends diagonally across the measuring table 17 in the path of an oncoming slat and when engaged by the slat deflects the forward end of the slat off of the table as indicated in Fig. 1. The momentum of the slat carries it to a point where it will fall of its own weight into the slat bin 23. The ejector arm 25 is provided with a surface 25a which is contacted by the oncoming slat, which surface extends normal to the plane of the table, that is, the table is horizontal and the surface 25a is substantially vertical and deflects the forward end of slats from the table.

As the ejector mechanism must be positionable at selective points along the table to handle different lengths of slats, it will be appreciated that it must be separate from the table and where an arm has been tried in which the lower edge of surface 25a began at the table, a crack was formed between the arm 25 and the table 17. While this crack was very small, it was found that the oncoming cut slat tended to dig into this crack and to cause ball-ups. It will be appreciated that the slats are run through the machine with their concave surface underneath and therefore the corner of the forward end of the slat which is engaged by the ejector arm 25 tended to dig into this crack between the table and arm. This was particularly found to be true where the slat was formed with a sharp corner instead of a rounded edge. This sometimes occurs when the slat material gets slightly out of line in the cutter and frequently caused ball-ups due to the tendency of the sharp corner to dig into the space between the table and arm 25.

In order to prevent the possibility of the oncoming slat from digging in underneath the ejector arm 25 there is provided a scoop 26 for lifting the forward edge of a cut slat from the measuring table and up into engagement with surface 25a at a point spaced from the measuring table so that there is no opportunity for the slat to dig in underneath the ejector arm 25. This scoop 26 may take any desired form but is preferably formed integral with the ejector arm with its scoop surface extending normal to the ejector surface 25a to form a right angular scoop and ejector surface of an integral piece of metal so that no crack between the scoop and ejector arm is present in which the cut slat might dig in and ball-up.

In order to prevent the slats from balling up as they are lifted onto the scoop, the bite edge of the scoop adjacent the measuring stop is beveled downwardly to provide a more or less knife edge contact with the measuring table. With normal slat stock material this is probably all that will be found to be necessary to lift the slats onto the scoop without ball-ups. However, where very, very thin slat material is used, it has been found that permitting the two corners of the forward end of a slat to simultaneously engage the scoop will occasionally cause a ball-up. It is therefore preferred to form the bite edge of the scoop so that the scoop is engaged successively in time spaced relationship by the two corners of the forward end of a slat. Preferably the bite edge is formed with a portion 27 extending normal to the direction of travel of the slat and positioned to engage one corner of the oncoming slat, and with a notched out portion in the path of the other corner of the oncoming slat as by forming a second portion 28 of the blade edge of the scoop diagonal to portion 27 and extending from portion 27 toward the ejector arm 25.

The angle of the diagonal portion 28 of the bite edge of scoop 26 may be any desired angle and the juncture of the portions 27 and 28 of the bite edge of the scoop may be at any desired point which will permit one corner of the front end of a cut slat to be lifted onto the scoop before the other corner of the front end of such slat is lifted onto the scoop.

While the scoop may be secured to the table in any desired manner, it will always be positioned immediately behind the measuring switch and therefore it is preferred that the scoop be carried by the securing means 29 for securing the measuring stop and switch mechanism to the table. With this arrangement the positioning of the measuring stop to cause the cutting of a slat of a predetermined length will automatically position the scoop and ejector arm to eject a slat of such length into the slat bin.

As best shown in Fig. 3, the switch mechanism carries with it a guide member 30 against which one side edge of the slat is positioned by the machine before the slat is cut from the stock material. This guide 30 will cause the cut slats to be fed under the measuring stop and switch and onto the scoop along a constant path.

Referring to Fig. 5, it will be seen that the means for securing the switch mechanism and ejector mechanism to the table may be provided by a clamp arrangement indicated generally at 31 which clamps the switch and ejector to two upstanding clamping flanges 32 and 33. The actuator bar 34 for lifting the measuring stop after a slat has been cut from the stock material runs between these two clamping flanges. With the arrangement shown it will be appreciated that the scoop may be held flat on the table and in firm engagement therewith before the securing means is clamped to the clamping flanges 32 and 33.

In operation, slat stock is continuously fed from reel 12 through the cutter 11 and routers 15 and 16 and through rollers 21 and 22 until the slat stock strikes the measuring stop 19 (see Fig. 4). The slat stock moves the stop 19 in the direction of movement of the stock a short distance to actuate a microswitch 35 positioned immediately rearward of the measuring stop, which microswitch through an electrical cable 36 causes actuation of the cutter and routers to cut and stamp the stock material to form a Venetian blind slat. As soon as a slat is cut the machine rotates the actuator bar 34 which lifts the measuring stop off of the table and permits the cut slat to be moved under the measuring stop and the microswitch arrangement by the drive and idle rollers 21 and 22. As the slat comes into engagement with the scoop 26, one corner engages the portion 27 of the edge of the scoop and is lifted onto the scoop. In time spaced relation with such movement the other corner of the front end of the cut slat comes into engagement with the notched portion 28 of the scoop and is lifted onto the scoop. Thereafter, the cut slat is driven by rollers 21 and 22 into engagement with the ejector arm 25 and the path of travel of the cut slat is deflected laterally to cause the slat to move laterally off of the table into the slat bin 23. As the cut slat clears the table, the following end of the slat material is moving onto the table and into engagement with the microswitch to repeat the operation.

While the ejector arm and scoop are shown to be one integral part, it will be appreciated that they might be two parts or that they might be separately positioned on the table by other means than shown, it only being necessary that the scoop be positioned between the ejector arm and the switch mechanism to lift the oncoming front end of a slat off of the table so that such end of the slat will engage the surface 25a of ejector arm 25 at points removed from the table so that such front end cannot dig in underneath the ejector arm and cause a ball-up.

It will further be appreciated that while the diagonal portion 28 of the bite edge of the scoop is necessary in some form to handle very thin material, it need not be in the form illustrated in the drawing, it only being necessary that one corner of the oncoming end of a slat be lifted from the table prior to the other corner coming into engagement with the scoop.

From the above it will be seen that all of the objects of this invention have been accomplished. There has been provided an ejector mechanism which is positive and not subject to ball-ups, which will laterally eject cut slats from the measuring table of a Venetian blind slat cutting machine. While the ejector assumes the easiest form of mechanism in that it acts upon the free front end of a cut slat, it does not have any moving parts and therefore does not in any way complicate the machine. By fashioning it to be secured to the fastening means for the measuring stop and switch mechanism, it may be secured in the proper position on the machine automatically when the measuring stop is positioned without further attention by the operator.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. As a subcombination, an ejector adapted to be releasably secured to a table along which thin strips are to be propelled longitudinally, said ejector comprising a substantially flat scoop with one of its ends forming a bite edge portion, and an arm integral with and extending approximately normal to the scoop and spaced from the bite edge, the arm extending away from said bite edge portion at an inclination thereto to deflect laterally the end of a strip passing from said bite edge portion into engagement with the arm, and a second bite edge portion disposed to intercept the end of a strip passing over the bite edge after such end is intercepted by said first portion, said second portion extending away from the first portion toward the arm.

2. In combination with a table along which thin strips are to be propelled longitudinally, an ejector secured to such table for the purpose of ejecting said strips laterally from said table, said ejector comprising a scoop having a sharp bite edge portion lying closely against such table in the path of strips so propelled, in position to engage beneath a strip so propelled and lift its leading end from the table on that side of the strip opposite the direction toward which it is to be ejected, and an ejector arm having an ejector surface facing toward said bite edge and integrally joined to a portion of said ejector substantially in the plane of said scoop and extending from said integral joinder in a direction approximately normal to the plane of said scoop, the line of intersection of said arm with the plane of said scoop extending in a direction away from the bite edge of said scoop and at an inclination to the path of propulsion of said strips toward the lateral direction in which the strips are to be ejected.

3. In combination with a table along which thin strips are to be propelled longitudinally, an ejector secured to such table for the purpose of ejecting said strips laterally from said table, said ejector comprising a scoop having a sharp bite edge portion lying closely against such table in the path of strips so propelled, in position to engage beneath a strip so propelled and lift its leading end from the table on that side of the strip opposite the direction toward which it is to be ejected, said scoop having a second sharp bite edge portion also lying closely against such table in the path of strips so propelled in position to engage beneath a strip so propelled and lift its leading end from the table on that side of the strip toward which it is to be ejected, and an ejector arm having an ejector surface facing toward said scoop bite edge and integrally joined to a portion of said ejector substantially in the plane of said scoop and extending from said integral joinder in a direction approximately normal to the plane of said scoop, the line of intersection of said arm with the plane of said scoop extending in a direction away from the bite edge of said scoop and at an inclination to the path of propulsion of said strips toward the lateral direction in which the strips are to be ejected.

References Cited in the file of this patent

UNITED STATES PATENTS

| 159,959 | Parker | Feb. 16, 1875 |
|---|---|---|
| 1,407,391 | Downer | Feb. 21, 1922 |
| 2,198,599 | Borzym | Apr. 30, 1940 |
| 2,247,766 | Boerger | July 1, 1941 |